(12) United States Patent
Rahman et al.

(10) Patent No.: US 7,636,177 B2
(45) Date of Patent: Dec. 22, 2009

(54) SYSTEMS AND METHODS FOR FORMING COMPOSITE IMAGES WITH DIGITAL GRAPHIC ELEMENTS

(75) Inventors: Shahana Rahman, Webster, NY (US); Joyce K. Nakada, Rochester, NY (US); Lami Akagwu, London (GB)

(73) Assignee: Xerox Corporation, Norwalk, CT (US)

( * ) Notice: Subject to any disclaimer, the term of this patent is extended or adjusted under 35 U.S.C. 154(b) by 992 days.

(21) Appl. No.: 10/830,111

(22) Filed: Apr. 23, 2004

(65) Prior Publication Data

US 2005/0237546 A1    Oct. 27, 2005

(51) Int. Cl.
*H04N 1/40*    (2006.01)
(52) U.S. Cl. ........................... 358/1.9; 358/468
(58) Field of Classification Search ............ 358/1.9, 358/2.1, 468, 474, 505–506, 450
See application file for complete search history.

(56) References Cited

U.S. PATENT DOCUMENTS

| 5,146,275 | A | | 9/1992 | Tone et al. | |
|---|---|---|---|---|---|
| 5,875,035 | A | * | 2/1999 | Motosugi et al. | 358/296 |
| 6,064,492 | A | * | 5/2000 | Eldridge et al. | 358/1.15 |
| 6,348,940 | B1 | * | 2/2002 | Sano et al. | 347/247 |
| 6,898,625 | B2 | * | 5/2005 | Henry et al. | 709/206 |
| 2001/0042086 | A1 | * | 11/2001 | Ueda et al. | 707/527 |

OTHER PUBLICATIONS

Micrografx Picture Publisher Limited Edition Reference Guide, © 1992. pp. 7-10 to 7-20, 7-26 to 7-31, and 7-40 to 7-44.*
"Xerography and Photocopying", George Watson, University of Delaware, copyright 1998; document version dated Apr. 19, 1999.*

* cited by examiner

*Primary Examiner*—Thomas D Lee
*Assistant Examiner*—Stephen M Brinich
(74) *Attorney, Agent, or Firm*—Oliff & Berridge, PLC

(57) ABSTRACT

Systems and methods for forming composite images which include at least one user-supplied standard or individually user-customized digital graphic element in image forming devices. The various exemplary embodiment of the systems and methods according to this invention provide the ability for any user, at any time, at the image forming device, to be able to present, select, modify, position and reproduce any standard or individually user-customized digital graphic element which has been stored on a transportable and adaptable digital data storage medium to be included as part of an output composite image from the image forming device.

12 Claims, 3 Drawing Sheets

SYSTEMS AND METHODS FOR FORMING COMPOSITE IMAGES WITH DIGITAL GRAPHIC ELEMENTS

BACKGROUND OF THE INVENTION

1. Field of Invention

This invention is directed to systems and methods for forming composite images which include user-supplied standard or individually user-customized digital graphic elements in image forming devices.

2. Description of Related Art

A variety of systems and methods are conventionally used to form complex composite output images in image forming devices. Sheets of paper having a company's pre-printed letterhead can be stored in an individual tray in a conventional printer in order that text sent from a number of devices to that printer will result in a composite image being produced when the text of the letter is printed on the pre-printed letterhead paper. Likewise, forms can be manually fed such that the text to be included in each space on the form is printed in the correlating spaces.

Separately, an organization may choose to develop a composite image at a copier and/or facsimile machine by using a transparent plastic overlay in order to provide watermarking or other effect in a document reproduced on a copier or forwarded via facsimile transmission.

Advanced desktop publishing methods allow a user to incorporate standard and/or user-customized individual image elements to enhance the looks of output images produced. These software elements combine to provide detailed end-product images when the information is output to an image forming device.

A significant limitation of these approaches is that the manual integration required can lead to inaccuracies, inefficiencies and waste of time and print supplies. Another limitation is that expensive software may be required in order for an organization to achieve the results that are sought.

U.S. Pat. No. 5,146,275 to Tone et al. provides a different approach to the development of composite images. Tone discloses an ability at a copier to have a series of preloaded marks available. A user can then select from among a limited number of marks in order to produce the composite output image when a sheet of text is copied by the apparatus disclosed therein. A significant drawback of Tone is that flexibility is very limited or reduced. This reduced flexibility is based on the fact that only a limited number of images may be made available, and that updating the image apparatus to provide new or different marks cannot be performed by the user, but instead may generally require the assistance of the copier manufacturer's or other specially trained personnel.

SUMMARY OF THE INVENTION

It is desirable to provide a user, at any time, at the image forming device, the ability to supply, select, adjust, position and reproduce any standard or individually user-customized digital graphic element which has been stored on a transportable and adaptable digital data storage medium to be formed as part of an output composite image from the image forming device.

In various exemplary embodiments, the systems and methods according to this invention provide the capability for a user to supply a digital data storage medium containing standard or individually user-customized digital graphic elements to an image forming device in order to form output composite images which include at least one of the supplied standard or user-customized digital graphic elements.

In various exemplary embodiments, the systems and methods according to this invention provide the user with the ability to select from among a plurality of standard or individually user-customized digital graphic elements stored on a digital data storage medium to be used to form output composite images in an image forming device.

In various exemplary embodiments, the systems and methods according to this invention are capable of accepting various user-supplied digital data storage media on which a user has stored and/or modified to the user's individual choice at least one standard or individually user-customized digital graphic element that is to be formed in an output composite image produced or reproduced by the image forming device.

In various exemplary embodiments, the systems and methods according to this invention provide a simple, user-friendly system that enables users to personalize images output from an image forming device with at least one standard or individually user-customized digital graphic element.

In various exemplary embodiments, the systems and methods according to this invention provide the user with the ability to adjust and position one or more of a plurality of user-supplied standard or individually user-customized digital graphic elements in a formed output composite image produced by an image forming device.

These and other features and advantages of the various disclosed embodiments are described in, or apparent from, the following detailed description of various exemplary embodiments of the systems and methods according to this invention.

BRIEF DESCRIPTION OF THE DRAWINGS

Various exemplary embodiments of the systems and methods according to this invention will be described, in detail, with reference to the accompanying figures, wherein.

DETAILED DESCRIPTION OF PREFERRED EMBODIMENTS

The following description of various exemplary embodiments of the systems and methods for forming an output composite image including at least one user-supplied standard or individually user-customized digital graphic element in an image forming device according to this invention may refer to one specific type of image forming device, such as a copier, for the sake of clarity and familiarity. However, it should be appreciated that the principles of this invention as outlined and/or discussed below, can be equally applied to any image forming device to include, but not be limited to, copiers, printers, scanners, facsimile machines or any other now known or later-developed system or device for producing, reproducing, and/or transmitting images.

The various exemplary embodiments of the systems and methods according to this invention allow a user of an image forming device to locally select at least one user-supplied standard or individually user-customized digital graphic element to be formed with an input image as an output composite image including the supplied and selected digital graphic element. Digital graphic elements, as contemplated for use in the various exemplary embodiments of the systems and methods according to this invention, include user-supplied standard or individually user-customized digital graphic elements such as, for example, logos, letterheads, standard headers/footers, pictures, watermarks, symbols, status stamps or any other standard or individually user-customized graphic element which can be digitized and stored on any manner of transportable and adaptable digital data storage medium for such use.

Figure 1:
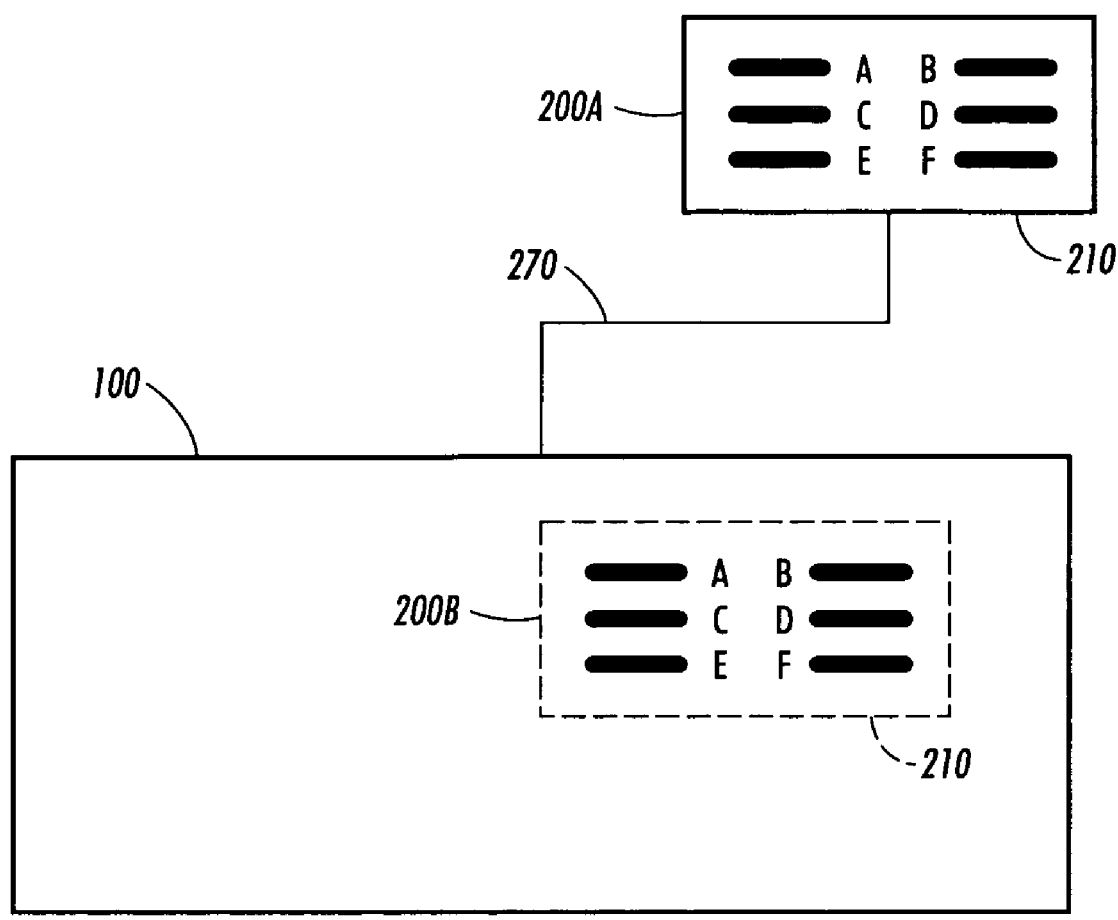
FIG. 1 illustrates an exemplary embodiment of an image forming device and digital graphic element forming unit according to this invention.

FIG. 1 illustrates an exemplary embodiment of an image forming device 100 and a digital graphic element forming unit 200 (alternative locations depicted as 200A and 200B) according to this invention. As shown in FIG. 1, an image forming device 100 according to this invention has a digital graphic element forming unit 200A attached to the image forming device 100 via some interface 270, or alternatively a digital graphic element forming unit 200B mounted internally. In either case, the digital graphic element forming unit 200 includes a plurality of discrete digital graphic element interface ports (depicted as 210A-F) usable to read digital graphic element data from any compatible digital data storage medium.

A user can supply stored standard or individually user-customized digital graphic element information to the image forming device 100 by means of any digital data storage medium that the digital graphic element input interface 210, of a digital graphic element forming unit 200 associated with an image forming device 100, is designed to accommodate. In various exemplary embodiments of the systems and methods according to this invention, the digital graphic element forming unit 200 of the image forming device 100 could be any device either internal, or connected externally, to the image forming device and capable of reading stored digital image data information from any digital data storage medium. Such digital data storage media include, for example, a CD, a DVD, a computer disk, a memory stick or card, a digital information card or plug (i.e. from a digital camera), or any other now known or later-developed digital data storage medium.

Figure 2:
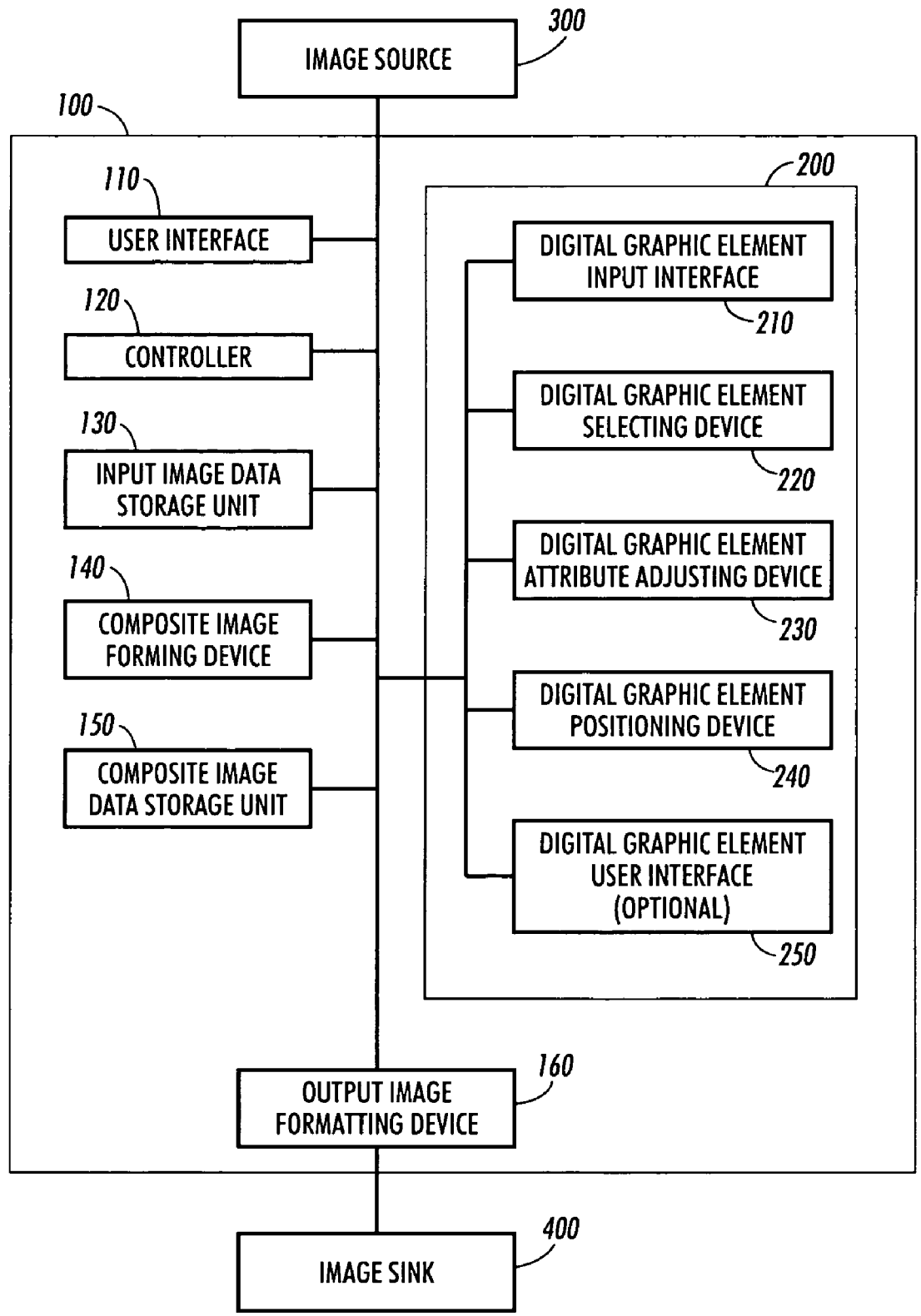
FIG. 2 is a functional block diagram of an exemplary embodiment of a system for forming output composite images which include at least one user-supplied standard or individually user-customized digital graphic element in an image forming device according to this invention.

FIG. 2 is a functional block diagram of an exemplary embodiment of a system for forming output composite images which include at least one user-supplied standard or individually user-customized digital graphic element in an image forming device according to this invention. As shown in FIG. 2, the image forming device 100 according to this invention includes: a user interface 110, a controller 120, an input image data storage unit 130, a composite image forming device 140, a composite image data storage unit 150, and an output image formatting device 160, all connected via a data/control bus 170 to a digital graphic element forming unit 200, an image source 300, and an image sink 400.

The digital graphic element forming unit 200 includes, as discretely connected individual components, or as a single composite unit, a digital graphic element input interface 210, a digital graphic element selecting device 220, a digital graphic element attribute adjusting device 230, a digital graphic element positioning device 240, and an optional digital graphic element user interface 250.

In various exemplary embodiments of the systems and methods according to this invention, the input image data is supplied by a user via the image source 300. The user then selects attributes that the user wishes to be included in the production and/or manipulation of the output image that is produced or reproduced from the image presented at the image source 300. The image source 300 can be any image receiving device such as, for example, a copier, a scanner, a facsimile machine, a digital still or video camera and/or a locally or remotely located computer connected by either a direct or a network link, including wireless links, to the image forming device, or any other now known or later-developed device that is capable of generating electronic digital source image data. The image source 300 can be integrated with, or connected remotely to, the image forming device 100. Although the image forming device substantially contemplated here is directed to the modification of the electronic image data that has been generated from an original physical document, the systems and methods according to this invention are not limited strictly to such an application.

Provision exists for internal storage within the image forming device 100 of input image data information such as, for example, digitized input image data information provided from the image source 300, augmented as appropriate with selected attribute adjustment information provided via the user interface 110, in the input image data storage unit 130. An input image, and input image attribute adjustment information, may be stored to support any beneficial use such as, for example, non-real time production or reproduction of an image, image comparison, system calibration and/or any other related purpose.

In the various exemplary embodiments of the systems and methods according to this invention, the user supplies digital graphic element information stored on any digital data storage medium to a compatible digital graphic element input interface 210 in the digital graphic element forming unit 200. In the same manner that the user selected and/or adjusted attributes of the input image via the user interface 110, so too can the user select from among a plurality of digital graphic elements contained on the digital data storage medium by making selections via the user interface 110, or the optional digital graphic element user interface 250. By so doing, the user presents user defined digital graphic image selection information to the digital graphic element selecting device 220 which in turn selects the at least one desired digital graphic element from among a plurality of digital graphic elements made available when the user-supplied the digital data storage medium to the digital graphic element interface 210.

In the various exemplary embodiments of the systems and methods according to the invention, the user can next adjust the attributes such as, for example, size, contrast, brightness of the selected digital graphic element by making externally-selectable inputs to the digital graphic element attribute adjusting device 230 via either the user interface 110, or the optional digital graphic element user interface 250. Such attribute adjustment and/or manipulation may include adjusting size, contrast and/or brightness of the digital graphic element either standing alone or in comparison to the input image presented from the image source 300. For example, a letterhead and/or logo could be brightly and boldly included to be centered at the top of the formed output composite image. On the other hand, a subdued watermark could be included to be positioned in the middle of the formed output composite image with the input text and/or images from the image source 300 boldly overlying it.

The user can also externally select for presentation in the output composite image the specific position where the user would like for the selected and adjusted digital graphic element to appear via user input through either the user interface 110, or the optional digital graphic element user interface 250, to the digital graphic element positioning device 240.

It should be appreciated that the digital graphic element forming unit 200, while shown in FIG. 2 as a unit internal to the image forming device 100, could be either a unit and/or capability internal to the image forming device, or a separate unit attached by any means such as, for example, cable, wireless and/or infra-red connection, which allows for the transmission of user-supplied stored digital data from the digital graphic element forming unit 200 to the data control bus 170 of the image forming device 100. Further, it should be appreciated that each of the individual elements of the digital graphic element forming unit could be presented as a separate connected device or as a part of a single composite unit.

In various exemplary embodiments of the systems and methods according to this invention, as noted above, the single user interface 110 could be used to control all of the separate devices, or the single unit, that make up the image forming device 100 and the digital graphic element forming unit 200. Alternatively, a separate optional digital graphic element user interface 250 could be provided to allow selection, adjustment and positioning of the supplied digital graphic elements discreetly, particularly in a case where the digital graphic element forming unit 200 is a wholly separate device externally connected to the image forming device 100.

It should be appreciated that, given the required inputs, software algorithms, hardware circuits, or any combination of software and hardware control elements can be used to implement the individual devices and units in the image forming device and specifically the digital graphic element forming unit for forming the output composite image including at least one user-supplied standard or individually user-customized digital graphic element.

Any of the data storage units depicted in FIG. 2 can be implemented using any appropriate combination of alterable, volatile, or non-volatile memory, or non-alterable, or fixed, memory. The alterable memory, whether volatile or non-volatile, can be implemented using any one or more of static or dynamic RAM, a floppy disk and disk drive, a writeable or re-writeable optical disk and disk drive, a hard drive, flash memory or any other like memory medium and/or device. Similarly, the non-alterable or fixed memory can be implemented using any one or more of ROM, PROM, EPROM, EEPROM, and optical ROM disk, such as a CD-ROM, or DVD-ROM disk and disk drive or any other like memory storage medium and/or device.

In various exemplary embodiments of the systems and methods according to this invention, once input image data and digital graphic element data are supplied, both of these adjusted or unadjusted by user input to the system, a composite image forming device 140 is provided which forms the output composite image by placing in, or superimposing on, the supplied input image, the at least one user-supplied standard or individually user-customized digital graphic element as selected, adjusted and positioned via user input.

In various exemplary embodiments of the systems and methods according to this invention, the output composite image data can be optionally stored in a composite image data storage unit 150. Such storage supports any beneficial purpose for which stored output composite image data may be usable, to include, but not limited to, non-real time production and/or reproduction, image comparison, system calibration and/or any other related purpose. The output composite image data, if stored in a composite image data storage unit 150, from there, or if not, then directly from the composite image forming device 140, is sent to the output image formatting device 160 to be formatted appropriately for presentation out of the image forming device 100 to an image sink 400. In general, the image sink 400 can be any device that is capable of outputting or storing the processed output composite image data generated by the systems and methods according to this invention, such as, for example, a printed image, a copied image, a facsimile image, or any other like hard copy output image, an image on a digital display device, image data exportable to a transportable memory device or digital data storage medium, or any other like digital image display capability.

Figure 3:
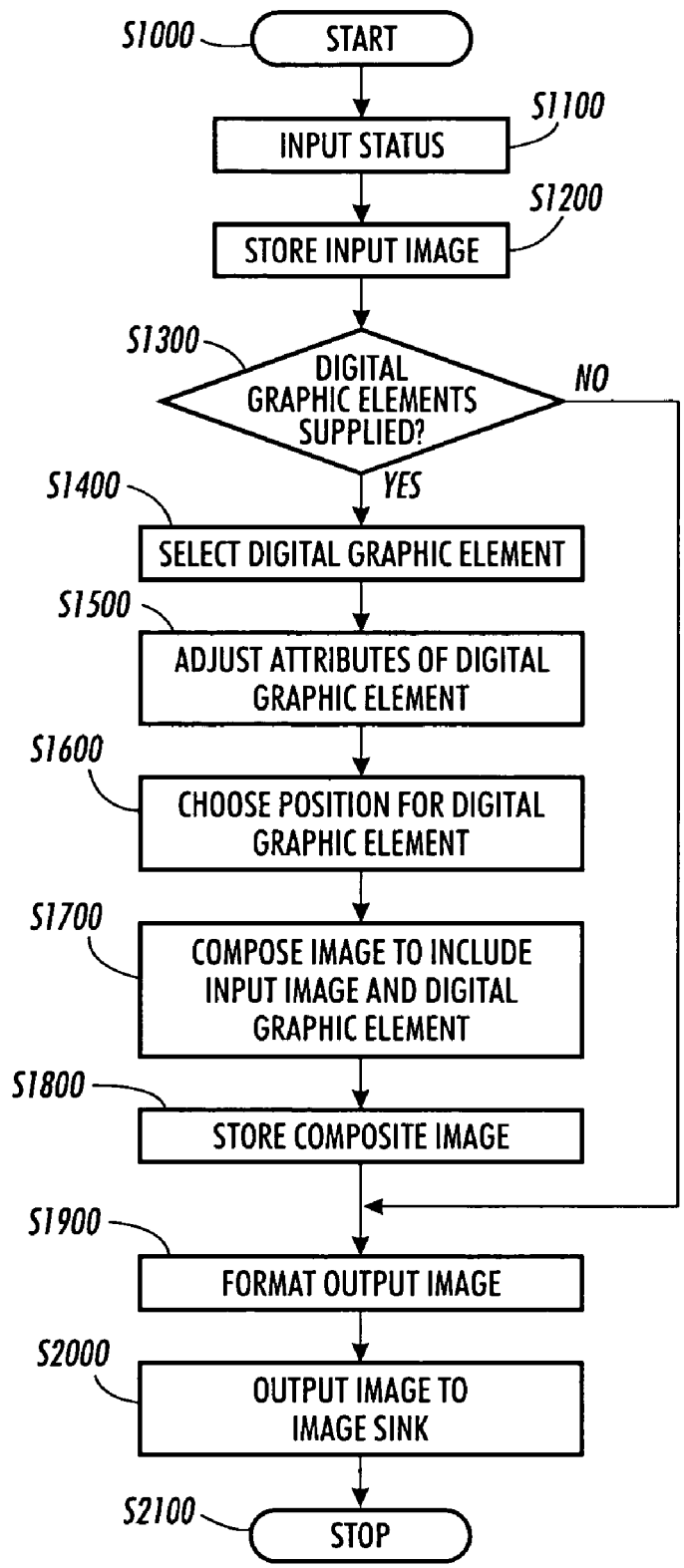
FIG. 3 is a flowchart of an exemplary embodiment of a method for forming an output composite image including at least one user-supplied standard or individually user-customized digital graphic element in an image forming device according to this invention.

FIG. 3 is a flowchart of an exemplary embodiment of a method for forming an output composite image including at least one user-supplied standard or individually user-customized digital graphic element in an image forming device according to this invention.

As shown in FIG. 3, operation begins at step S1000 and continues to step S1100, where an input image is acquired. The operation then continues directly to step S1300 or alternatively to optional step S1200.

If operation proceeds to step S1200, acquired input image data is stored in an input image data storage unit for later production, reproduction, image comparison, system calibration and/or any other reason for which interim storage of input image data may be usable or beneficial. The operation then continues to step S1300.

In step S1300, a determination is made, either manually or automatically, whether the user has supplied standard or individually user-customized digital graphic elements, or digital graphic element information, to the image forming device.

Generally, the user supply function is accomplished by a user providing a compatible digital data storage medium to a digital data storage medium reading device either located in or connected to an image forming device. The objective of this method is that any user, at any time, can introduce any digital graphic element to the image forming device such that at least one user-supplied standard or specifically user-customized digital graphic element can be formed into an output composite image from the image forming device.

If a determination is made in step S1300 that user-supplied standard or individually user-customized digital graphic elements, or digital graphic element information, are not available to the image forming device, the digital graphic element production and/or reproduction steps are bypassed and the operation proceeds directly to step S1900.

If a determination is made in step S1300 that user-supplied standard or individually user-customized digital graphic elements, or digital graphic element information, are available to the image forming device, the operation proceeds to step S1400.

In step S1400, at least one standard or individually user-customized digital graphic element is selected from among potentially a plurality of standard or individually user-customized digital graphic elements supplied by the user to the image forming device. This selection step can be manual based on user input via any method of user input interface, or the selection step can be automated based on parameters stored in a controller for such purpose. Once the at least one user-supplied standard or individually user-customized digital graphic element is selected, the operation continues to step S1500.

In step S1500, the user can adjust certain attributes of the at least one user-supplied and selected standard or individually user-customized digital graphic element. These attributes include, but are not limited to, size, color, contrast, clarity and/or intensity of the digital graphic element as it is to be formed in the output composite image. In this manner, a user is provided the ability to blend the user-supplied standard or individually user-customized digital graphic element to be included in an output composite image with the color, contrast, clarity, intensity and/or other attributes of the input image. The operation continues to step S1600.

In step 1600, the position for the user-supplied, selected and adjusted standard or individually user-customized digital graphic element in the output composite image is selected. This selection process can either be manual based on user input via a user input interface, or automatic with certain parameters for placement assigned to, and stored with, the data provided for the digital graphic elements on the digital data storage medium containing the digital graphic element image data. The operation continues to step S1700.

It should be appreciated that, though the discussion of the operation with respect to steps S1400-S1600 has been limited to selection, adjustment, and positioning of at least one user-supplied standard or individually user-customized digital graphic element, such description has been limited for purposes of clarity only. In various exemplary embodiments, image forming devices according to this invention could easily include a capacity for selection, adjustment and positioning of multiple user-supplied standard or individually user-customized digital graphic elements in a single output composite image from the image forming device.

In step S1700, the input image and the at least one user-supplied standard or individually user-customized digital graphic element selected, adjusted and positioned, either automatically or via user input, are formed into a single output composite image. The operation continues to optional step S1800.

In optional step S1800, output composite image data is stored for later production, reproduction, image comparison, system calibration and/or any other reason for which storage of such output composite image data may be usable or beneficial. The operation continues to step S1900.

In step S1900, the output composite image is formatted as required to comply with the display and/or image production capabilities of the image sink. The operation continues to step S2000.

In step S2000, the output composite image, appropriately formatted, is output to an image sink. The operation continues to step S2100 where the operation stops.

While this invention has been described in conjunction with exemplary embodiments, these embodiments should be viewed as illustrative, not limiting. Various modifications, substitutes, or the like are possible within the spirit and scope of the invention.

What is claimed is:

1. An image forming device, comprising:
   an imaging source that scans an input document to obtain input image data;
   a digital graphic element forming unit that processes user-supplied digital graphic element data;
   the digital graphic element forming unit being configured to read user-supplied digital graphic element data including at least one of a standard or individually user-customized digital graphic element from at least one digital data storage medium and to store the read user-supplied digital graphic element data in the digital graphic element forming unit of the image forming device,
   a composite image forming device that forms a composite image based on the obtained input image data and the user-supplied digital graphic element data, and
   an output unit that prints the composite image on an image receiving substrate,
   wherein the digital graphic element forming unit further comprises:
   a digital graphic element input interface that is usable to input image data associated with the at least one of the standard or individually user-customized digital graphic element from the at least one digital data storage medium;
   a digital graphic element selecting device that allows the user to select in the image forming device the at least one of the standard or individually user-customized digital graphic element stored in the digital graphic element forming unit in the image forming device;
   a digital graphic element attribute adjusting device in the image forming device that allows the user to adjust attributes of the selected digital graphic element; and
   a digital graphic element positioning device that allows the user to position the selected digital graphic element in the composite image.

2. The device of claim 1, further comprising a user interface in the image forming device configured to allow the user to select the at least one of the standard or individually user-customized digital graphic element from among a plurality of standard or individually user-customized digital graphic elements stored in the digital graphic element forming unit in the image forming device.

3. The device of claim 1, further comprising a user interface in the image forming device configured to allow the user to adjust one or more attributes of the at least one digital graphic element.

4. The device of claim 3, wherein the one or more attributes include at least one of color, contrast, clarity, and intensity of the at least one digital graphic element with respect to one or more like attributes of the obtained input image.

5. The device of claim 1, further comprising a separate digital graphic element user interface by which the user controls the digital graphic element forming unit apart from an input interface by which the user controls the image forming device.

6. The device of claim 1, wherein the image forming device is a photocopying device.

7. The device of claim 1, wherein the image forming device is a xerographic image forming device.

8. A method for forming a composite image in an image forming device, comprising:
   scanning an input document to obtain an input image in the image forming device;
   retrieving at least one user-supplied digital graphic element stored in the image forming device;
   determining, by a user via a user interface in the image forming device, a position of the retrieved digital graphic element in the composite image prior to forming the composite image; and
   forming a composite image on an image substrate output by the image forming device by combining the obtained input image and the retrieved at least one user-supplied digital graphic element.

9. The method of claim 8, further comprising supplying the at least one user-supplied digital graphic element to be stored in the image forming device by reading digital graphic element data from a user-supplied digital data storage medium.

10. The method of claim 9, wherein retrieving the at least one user-supplied digital graphic element further comprises selecting, by a user via a user interface in the image forming device, the at least one user-supplied digital graphic element from among a plurality of user-supplied digital graphic elements stored in the image forming device.

11. The method of claim 8, further comprising adjusting, by a user via a user interface in the image forming device, one or more attributes of the retrieved digital graphic element prior to forming the composite image.

12. The method of claim 11, wherein the one or more attributes adjusted by the user include at least one of color, contrast, clarity, or intensity of the at least one retrieved digital graphic element with respect to one or more like attributes of the obtained input image.

* * * * *